Nov. 13, 1962 A. BENDER 3,064,177
TRANSISTORIZED POWER SUPPLY
Filed Dec. 5, 1955 2 Sheets-Sheet 1

APPLIED VOLTAGE - 1.5 VOLTS D.C.
FREQUENCY - 300 CYCLES/SEC.

WAVE FORM AT COLLECTOR (POINT C)
APPLIED VOLTAGE 1.5 VOLTS
FREQUENCY - 300 CYCLES/SEC.

WAVE FORM AT POINT V-AC
FREQUENCY 300 CYCLES/SEC.

VOLTAGE - POINT V-D.C. TO GROUND

INVENTOR.
ALFRED BENDER
BY Kenyon and Kenyon
ATTORNEYS

Nov. 13, 1962 A. BENDER 3,064,177
TRANSISTORIZED POWER SUPPLY
Filed Dec. 5, 1955 2 Sheets-Sheet 2
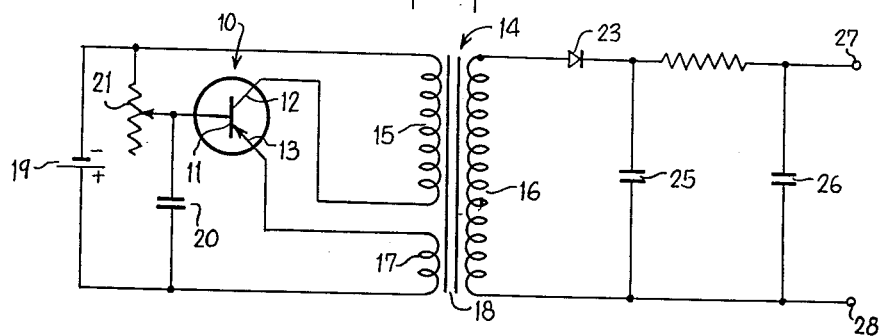
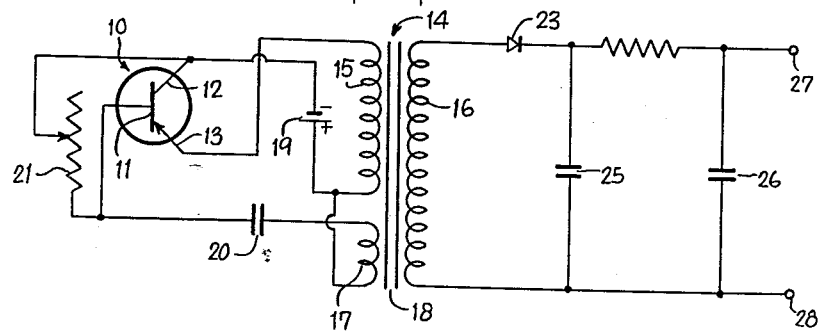
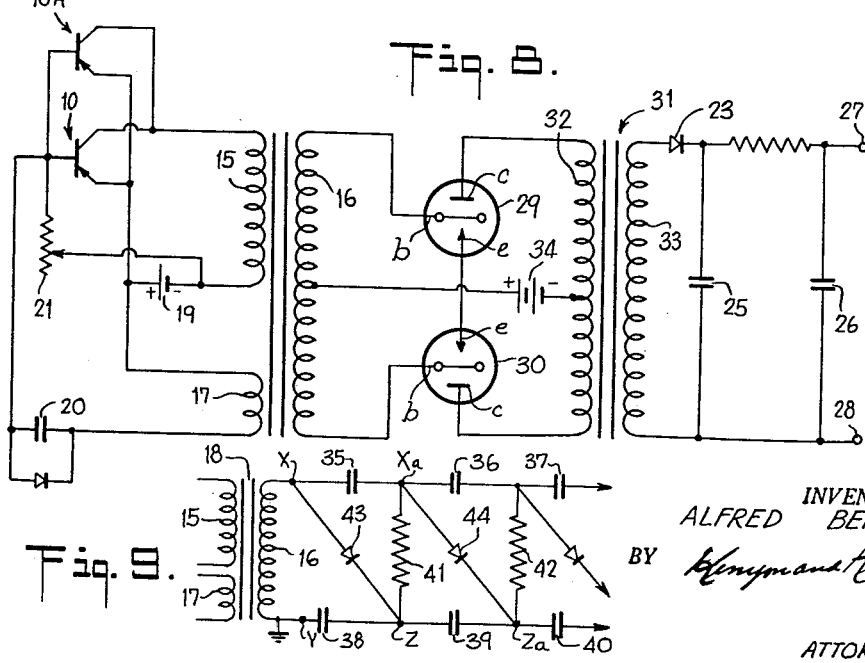
INVENTOR.
ALFRED BENDER
BY Kenyon and Kenyon
ATTORNEYS United States Patent Office 3,064,177
Patented Nov. 13, 1962

3,064,177
TRANSISTORIZED POWER SUPPLY
Alfred Bender, Great Neck, N.Y., assignor, by mesne assignments, to Universal Transistor Products Corporation, New York, N.Y., a corporation of Delaware
Filed Dec. 5, 1955, Ser. No. 551,050
13 Claims. (Cl. 321—2)

This application is a continuation-in-part of the co-pending application Serial No. 518,739, filed June 29, 1955, and now abandoned.

The present invention relates generally to high-voltage direct-current power supplies, and more particularly to power supplies energized by a low-voltage direct-current source.

For mobile applications, such as in automobiles and in aircraft, it is known to produce direct-current at high-voltage by using a vibratory contact. The vibratory contact serves to change the direct-current delivered by a battery into alternating current that can be stepped up by a transformer and rectified. Such electromechanical power supply devices are bulky and have a fairly short life. Moreover, vibratory power supplies usually operate from multicell storage batteries and draw a relatively heavy current. As a practical matter, they are incapable of functioning effectively from smaller D.-C. sources, such as a single cell flashlight battery.

There are many instruments currently in use which require high D.-C. voltages. For example, the portable-type Geiger Muller and scintillation counters have come into great demand for purposes of uranium prospecting, radiation leakage detection, military and civilian defense and in other applications where these instruments must be readily portable.

Conventional radiation detection devices rely for their electrical energy on series-connected batteries of large size. These batteries are quite cumbersome and limit the user in his ability to transport the radiation devices over difficult terrain. In addition, the weight of the battery quickly fatigues the user as he carries the instrument over the region of suspected radiation. Moreover, the replacement of such batteries is quite expensive and this is a serious drawback to an individual prospector who is working on limited capital.

Where the D.-C. voltage requirements for the instrument are in the range of 300 to 5000 volts as with oscilloscopes, ionization chambers or photomultipliers, the large number of batteries required is a material disadvantage from the standpoint of compactness, portability and expense. With the present-day tendency toward miniaturized equipment, existing direct-current power supplies are a limiting factor which militates against compact, lightweight design.

Accordingly, it is the principal object of my invention to provide a novel and useful high-voltage power supply adapted to operate from a low voltage battery without the use of electromechanical vibrators or other electrical interrupters.

More particularly, it is an object of my invention to provide a high-voltage power supply wherein a low-frequency oscillator operated from a battery produces periodic high voltage pulses, which pulses when rectified furnish the desired voltage. An important feature of the invention resides in the use of a transistor blocking-oscillator energized from a single cell battery to generate pulses which when rectified affords direct-current voltages having a magnitude in the order of 1000 volts or more. Yet another object of the invention is to provide a transistorized power supply, as above-described, of highly compact, efficient and stable design, the supply incorporating a single transistor element of the point contact or junction type.

Still another object of the invention is to provide a high-voltage D.-C. power supply for use with portable instruments, which supply is light in weight, of simple and sturdy construction and adapted to stand the rough handling encountered in ordinary usage.

Briefly stated, a power supply in accordance with the invention is constituted by a transistor relaxation or blocking oscillator arranged to generate periodic pulses at a relatively low frequency, said oscillator including a pulse step-up transformer yielding high voltage pulses which, when rectified and filtered, provide a substantially constant direct-current high voltage. The power supp y may be energized by a low-voltage source in the form of a single 1.5 volt battery such as is generally used in flashlights.

When a power supply in accordance with the invention is employed in conjunction with a radiation detection device, the battery has been found to have a life as long as 1000 hours, which on a twenty-four hour continuous use basis is approximately the shelf life of such batteries in a flashlight. By employing these batteries, I am able to develop up to 2000 volts, and currents in the order of 20 microamperes. Needless to say, the replacement cost of the batteries is negligible as compared to the replacement cost of the presently-used large size batteries. The invention is by no means limited to use with a single 1.5 volt battery and power supplies of high current, and high voltage ratings are possible by the use of push-push and push-pull transistor oscillator circuit arrangements operated by low-voltage batteries having a high-current capacity. The invention also for the first time makes feasible an efficient high-voltage supply operated by a low-voltage D.-C. source for powering portable television receivers, radar systems and the like incorporating cathode ray tubes having high-voltage requirements.

For a better understanding of the invention as well as other objects and further features thereof, reference is had to the following detailed description to be read in conjunction with the accompanying drawings wherein like components in the several circuits are identified by like numerals.

In the drawings:

FIG. 6 is a schematic circuit diagram of a second embodiment of the invention;

FIG. 7 is a schematic circuit diagram of a third embodiment of the invention;

FIG. 8 is a schematic circuit diagram of a fourth embodiment of the invention;

FIG. 9 is a schematic diagram of a fifth embodiment of the invention.

Figure 1:
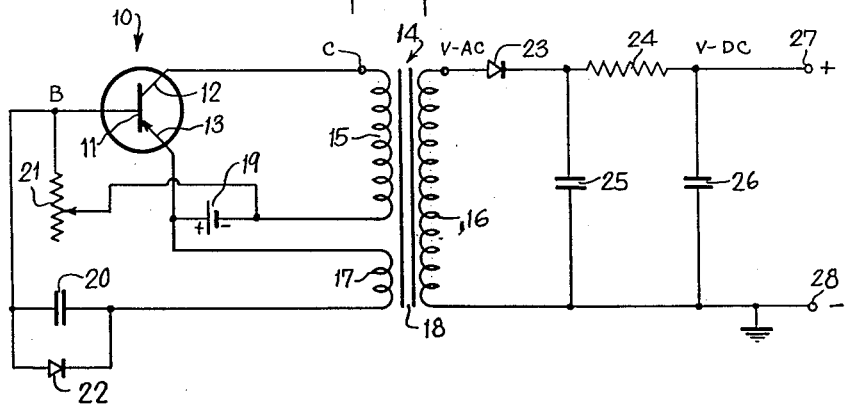
FIGURE 1 is a schematic circuit diagram of one preferred embodiment of a power supply in accordance with the invention.

Referring now to the drawings and more particularly to FIG. 1, there is shown a power supply incuding a transistor, generally designated by numeral 10, having a base electrode 11, a collector 12 and an emitter 13. Transistor 10 is of the so-called PNP junction or point contact type or an equivalent thereof. As is well known, the point-contact transistor consists of a block of N type or P type germanium which serves as the base, and two metallic point contacts in close proximity to one another on the germanium. After a process of forming, one contact whisker serves as the collector and the other as the emitter. In the junction transistor, the crystal is provided with alternate N, P, N or P, N, P layers.

Also included is a pulse step-up transformer, generally designated by numeral 14, including a primary winding 15, a secondary winding 16 and a tertiary or tickler winding 17, the windings being wound on a nonsaturable core 18. By non-saturable core is means one made of a magnetic material which can be saturated only by a relatively high magnetomotive force, such that within the range of normal operating currents for the transformer the core is never driven to the point of saturation. The transformer design is such as to provide maximum mutual inductance, minimum leakage inductance and minimum distributed capacitance. To provide a core of high permeability and to reduce eddy current losses, it is important that the core 18 be constituted by very fine laminations of a material such as silicon steel, silicon nickel steel or permalloy. Leakage inductance is minimized by the primary and secondary as close together as voltage breakdown will permit, for the space between the two windings is responsible for most of the leakage inductance. The effect of the distributing capacitance on pulse shape is made negligible by operating the transformer in the oscillator circuit at a relatively low frequency.

The low voltage source for the transistor is constituted by a battery 19 which in practice may be a single 1.5 volt flashlight cell. One terminal of primary winding 15 is connected to the collector 12, the other terminal being connected to the negative terminal of battery 19, the positive terminal thereof being connected to the emitter 13. The tickler winding 17 is connected at one end to the emitter 13 and at the other end through a capacitor 20 to the base 11 of the transistor. A variable resistor 21 is connected between the negative terminal of battery 19 and the base electrode 11 to apply bias to said transistor. Shunted across capacitor 20 is a unidirectional device or rectifier 22.

The transistor circuit operates as a blocking oscillator or pulse generator to induce periodic voltage pulses in the secondary winding 16. These pulses are stepped up and then rectified and filtered by means of a rectifier 23, a resistor 24 and filter condensers 25 and 26. One end of the secondary 16 is connected through rectifier 23 in series with resistor 24 to the positive output terminal 27 of the supply. The other end of the secondary is connected to the negative output terminal 28 of the supply. Condensers 25 and 26 are connected between either side of resistor 24 and the negative terminal 28.

In operation, battery 19 supplies power for transistor 10 and energy therefrom flows through primary 15 of the transformer, thereby inducing a voltage in tickler 17 which is positively fed back to the transistor. The primary winding constitutes the output circuit of the oscillator and the tickler the input circuit. The feed back or positive regeneration is in a phase relation producing increased current flow through primary 15.

This regenerative process is repeated until such time as the bias established by capacitor 20 on the base of the transistor begins to effect a decrease in current through the primary 15. Regeneration then takes place in the opposite direction until such time as the bias attains a value effecting an increase in primary current, at which point the whole cycle of operation is repeated. Thus the blocking oscillator acts as an inductively coupled, regenerative amplifier to produce periodic pulses or voltage surges. To reduce battery consumption and thereby increase the efficiency of the supply, the unidirectional device 22 functions to prevent reverse regeneration, so that the output pulses are all positive-going in character.

Figure 2:
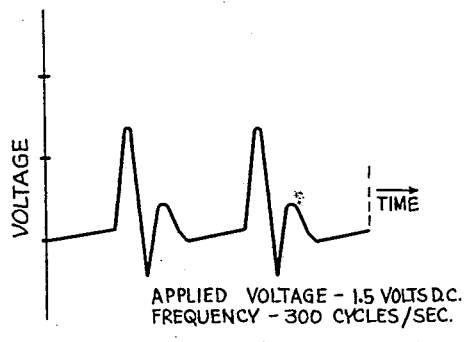
FIG. 2 is a curve illustrative of the wave form of the pulses generated at the base electrode of the transistor oscillator.

The shape of the oscillatory voltage curves as well as the amplitude thereof is of course controlled by the circuit constants and the turns ratio of the transformer primary and tertiary windings. In the circuit given by way of example in FIG. 1, this ratio is of the order of 12 to 1. Also, the values of the circuit components are preferably so chosen as to obtain a voltage curve or wave shape shown in FIGS. 2 and 3 at the points indicated in FIG. 1 as B, C, V–AC and D–DC. While the curves show each pulse as constituted by a positive-going impulse followed by a negative-going impulse, actually the presence of the unidirectional device 22 eliminates the negative-going impulses from the oscillator output.

Figure 3:
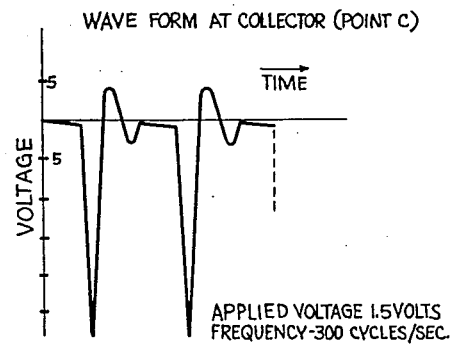
FIG. 3 is a curve illustrative of the wave form of the pulses generated at the collector electrode.
Figure 4:
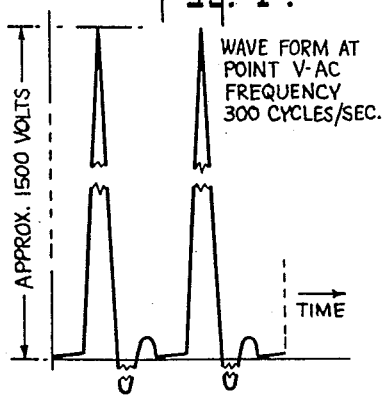
FIG. 4 is a curve illustrative of the wave form of the pulses generated at a point between the secondary winding of the transformer and the rectifier.

Inasmuch as the ratio of the secondary winding 16 to that of primary 15 is, for example, in the order of 600 to 12, the pulsatory voltages induced in the secondary are stepped-up enormously both by the high turns ratio and also by reason of the steep leading edge of the pulse-shaped wave shown in FIG. 3 (taken at point C in the circuit of FIG. 1).

The transistor oscillator is arranged to generate pulsating voltages at a frequency rate preferably in the range of 300 to 1200 cycles per second. This low frequency, which is governed by the inductive, reactive and resistive circuit constants of elements 15, 20 and 21, represents a compromise between capacitive or other losses and effects and the size of filtering components and makes possible a decrease in the sizes of the circuit components required for filtering without undue losses. With a power supply circuit operating in this low frequency range, an efficiency as high as 74% is attainable. Theoretically, operation in the higher frequency range should provide voltage pulses having steeper leading edges. On the other hand, at the higher frequencies, the $I^2R$ drop encountered between the junctions of the transistor, the hysteresis losses developed in the core of the transformer and losses resulting from distributed capacitance tend materially to lower the efficiency of the device. It has been found, that maximum output and the greatest efficiency are yielded by the supply when operating in the low-frequency range of 300 to 1200 cycles per second.

Figure 5:
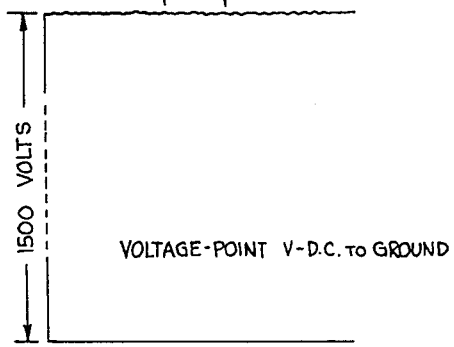
FIG. 5 is a curve showing the voltage across the output terminals of the power supply.

The high voltage pulses produced in the output of the pulse transformer secondary winding are rectified by diode 23, which may be a small selenium or germanium rectifier, and then filtered by the R-C network 24, 25, 26 to eliminate the ripple from the rectified voltage. As indicated in FIG. 5, with the circuit shown, the residual ripple is 1.2 volts in a 1500 volts output. The output voltage may be adjusted by means of variable resistor 21. When the presence of ripple in the output is not significant in the application intended for the supply, the filter network may be omitted.

The components employed in the circuit of FIG. 1 may have the following values:

Capacitor 20—1 to 10 microfarads
Capacitors 25 and 26—.01 to 0.1 microfarad
Resistor 21—variable from 400 to 10,000 ohms
Resistor 24—from 100K to 10 megohms Should it be desired to use a NPN transistor, rather than the PNP as shown, it is necessary only to reverse the battery 19, the circuit otherwise being identical to that in FIG. 1. By means of variable resistor 21 it is possible to adjust the output voltage throughout a wide range of valves, say between 200 to 2000 volts.

The circuit shown in FIG. 1 is of the so-called grounded-emitter type. It is also possible within the context of the invention to provide a grounded-base circuit as shown in FIG. 6, or a grounded-collector circuit as shown in FIG. 7.

In the grounded base circuit, as shown in FIG. 6, primary 15 is connected at one end to the collector 12 and at the other end through variable resistor 21 to base 11, the tickler 17 being connected at one end to the emitter 13 and at the other end through capacitor 20 to base 11. The battery 19 is connected at its negative end to the junction of the resistor 21 and primary 15 and at its positive end to the junction of capacitor 20 and tickler 17.

The operation of this oscillator is similar to that described in connection with FIG. 1 and need not therefore be set forth.

In the grounded-collector circuit shown in FIG. 7, one end of primary 15 is connected to emitter 13, the other end being connected to the positive side of battery 19, the negative side being connected to the collector 12. Base 11 is connected through capacitor 20 to one end of tickler 17, the other end being connected to the positive terminal of battery 19. Resistor 21 is connected between the collector 12 and the base 11. The operation of this circuit is also similar to that of FIG. 1.

The circuit shown in FIG. 8 is designed to provide an exceptionally high voltage and current output. The circuit comprises a transistor blocking-oscillator whose output is fed to a push-pull transistor pulse amplifier, the amplified output being doubled and thereafter rectified and filtered. The oscillator circuit is identical to that shown in FIG. 1, save that an additional transistor 10A is connected in parallel relation with transistor 10 to augment the power output of the oscillator. Additional parallel transistors may be used, if desired, in this circuit or in the circuits of FIGS. 1, 6 and 7.

The push-pull amplifier includes two junction type transistors 29 and 30 of the PNP type, each including an emitter $e$, a base $b$ and a collector $c$. The base $b$ of both transistors is connected to the respective ends of the secondary 16, the secondary in this instance being center-tapped. Also provided is an output step-up transformer 31 of the pulse type having a center-tapped primary 32 and a secondary 33. The collector electrodes $c$ of the transistors are connected to the respective ends of the primary 32, the center-tap of the primary being connected to the negative side of a battery 34 whose positive side is connected to the emitters $e$ of the transistors.

The secondary 33 is connected to a rectifier and filter, as above described. It is to be understood that other forms of push-pull circuits may be used where, in lieu of transistors of the same conductivity type, transistors of opposite conductivity type may be employed. For purposes of simplicity, the input biasing circuit has not been shown, this circuit depending upon the class of operation employed, that is, class A or class B.

Referring now to FIG. 9, there is shown a power supply in which the rectifier and filter circuit is arranged in a cascade network to provide voltage doubling effects whereby exceptionally high voltages may be obtained from a low voltage battery source. The pulse generator employed in conjunction with this circuit may be identical with that shown in FIG. 1, hence only the transformer portion of the pulse generator is illustrated in FIG. 9. Connected serially to one end (point X) of the secondary 16 are condensers 35, 36 and 37, and connected serially to the other end (point Y) of the secondary are condensers 38, 39 and 40. Connected between the junction (point Xa) of condensers 35 and 36 and the junction (point Z) of condensers 38 and 39 is a resistor 41. A resistor 42 is connected between the junction of condensers 36 and 37 and the junction (point Za) of condensers 39 and 40. A rectifier 43 is connected between points X and Z and a rectifier 44 is connected between points Xa and Za.

Let us assume that the pulse voltage developed at points X and Y at the output of the secondary is 1000 volts. The arrangement is such that the rectified voltage between points Y and Z will also be substantially 1000 volts. However, between points Z and Za the voltage will be doubled that is, it will be 2000 volts. In the succeeding stages (not shown) further doubling of the output is effected.

While voltage doubling circuits are known in conjunction with sinusoidal voltages, the application of "single-ended" pulses as disclosed herein makes possible maximum utilization of the pulses. The circuit also enables the use of indentically valid rectifiers and capacitors as the output voltage is multiplied. The use of the doubling circuit also permits the use of a common ground, as shown connected to point Y.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A high-voltage power supply energized from a low-voltage battery source, said supply comprising a relatively low frequency pulse generator operative within a frequency range of approximately 300 to 1200 cycles per second energized by said source and including a transistor, a step-up pulse transformer having a non-saturable magnetic core on which is wound a primary winding, a secondary winding, and a tickler winding, and an oscillatory circuit having means connecting said primary winding and said tickler winding to said transistor in positive regenerated relationship to produce periodic voltage pulses, said primary and secondary winding having a turns ratio yielding stepped-up pulses at said secondary winding, and means to rectify the output of said secondary winding, said transformer having a non-saturable core common to said windings constituted by relatively fine laminations of a metal of high permeability to reduce eddy current losses.

2. A high-voltage supply, as set forth in claim 1, wherein said transistor is of the NPN type.

3. A high-voltage supply, as set forth in claim 1, wherein said transistor is of the PNP type.

4. A high-voltage power supply energized from a direct current low voltage source, said supply comprising a pulse generator energized from said source and operative at a frequency approximately in the range of 300 to 1200 cycles per second, said generator including a transistor, a pulse transformer having a non-saturable magnetic core on which is wound primary, secondary and tickler windings, an oscillatory circuit provided with means connecting said primary and tickler windings in positive regenerative relation and a resistance-capacitance blocking network connected to the regenerative circuit to produce periodic voltage pulses in said primary winding, said primary and secondary windings having a turns ratio effecting voltage step-up of said pulses, and means coupled to said secondary winding to rectify and filter the stepped-up pulses.

5. A supply, as set forth in claim 4, wherein said transistor is provided with emitter, collector and base electrodes and is connected as a grounded-emitter in said oscillatory circuit.

6. A supply, as set forth in claim 4, wherein said transistor is provided with emitter, collector and base electrodes and is connected as a grounded collector in said oscillatory circuit.

7. A supply, as set forth in claim 4, wherein said transistor is provided with emitter, collector and base electrodes and is connected as a grounded base in said oscillatory circuit.

8. A high-voltage power supply energized from a direct current low voltage source, said supply comprising a pulse generator operative at a frequency in the range of 300 to 1200 cycles and including a transformer having a magnetic core on which is wound primary, secondary and tickler windings, a capacitor, a resistor and a transistor having base, emitter and collector electrodes, said primary being connected at one end to said collector and at the other end through said source to said emitter, said tickler being connected at one end to said emitter and at the other end through said capacitor to said base, said resistor being connected between said base and the junction of said primary and said source, whereby pulses are produced in said primary which are stepped-up in said secondary, and means to rectify said pulses, said magnetic core being non-saturable and being constituted by fine laminations of a metal of high permeability.

9. A high-voltage power supply energized from a low voltage battery comprising a pulse generator operative at a frequency in the range of 300 to 1200 cycles and including a transformer having a non-saturable magnetic core on which is wound primary, secondary and tickler windings, a capacitor, an adjustable resistor, and a transistor having base, emitter and collector electrodes, one end of said primary being connected to said collector, the other end of said primary being connected serially through said battery and said tickler to said emitter, said resistor being connected between said base and one end of said battery, said capacitor being connected between said base and the other end of said battery, and means coupled to said secondary to rectify the pulses yielded thereat.

10. A power supply, as set forth in claim 9, wherein said transformer includes a non-saturable core formed by fine laminations of high permeability metal and said primary and secondary windings are wound thereon to produce maximum mutual inductance and minimum leakage inductance.

11. A high-voltage power supply energized from a low voltage battery comprising a pulse generator operative at a frequency in the range of 300 to 1200 cycles and including a transformer having a non-saturable magnetic core on which is wound primary, secondary and tickler windings, a capacitor, an adjustable resistor, and a transistor having base, emitter and collector electrodes, one end of said primary and one end of said tickler being connected to said emitter, the other end of said primary being connected through said battery to said collector, the other end of said tickler being connected through said capacitor to said base, said resistor being connected between said base and said collector, and means to rectify the output of said secondary winding.

12. A power supply as set forth in claim 4, further including a push-pull transistor amplifier interposed between said secondary winding and said rectifying means to increase the voltage of said pulses.

13. A power supply as set forth in claim 4, wherein said rectifying means is constituted by a cascade network of voltage-dubling stages each of which includes a rectifier element.

References Cited in the file of this patent
UNITED STATES PATENTS

| | | |
|---|---|---|
| 1,938,208 | Biver | Dec. 5, 1933 |
| 2,459,988 | Boadle | Jan. 25, 1949 |
| 2,556,296 | Rack | June 12, 1951 |
| 2,666,139 | Endres | Jan. 12, 1954 |
| 2,745,010 | Stansel | May 8, 1956 |
| 2,757,475 | Pankove | Aug. 7, 1956 |
| 2,780,767 | Janssen | Feb. 5, 1957 |
| 2,784,262 | Crow | Mar. 5, 1957 |

FOREIGN PATENTS

| | | |
|---|---|---|
| 728,024 | Great Britain | April 13, 1955 |

OTHER REFERENCES

"Transistor Power Supply for Geiger Counters," by Pearlman, Electronics (August 1954). Pages 144–145 relied on.

"Transistor Power Converters," by Hamlin, C. Q. (May 1958). Pages 42 and 43 relied on.